United States Patent [19]

Peterson

[11] Patent Number: 4,780,220

[45] Date of Patent: Oct. 25, 1988

[54] DRILLING AND COMPLETION FLUID

[75] Inventor: Thomas E. Peterson, Gonzales, Tex.

[73] Assignee: Hydra Fluids, Inc., Houston, Tex.

[21] Appl. No.: 53,472

[22] Filed: May 26, 1987

[51] Int. Cl.$^4$ .................................................. C09K 7/02
[52] U.S. Cl. .............................. 252/8.514; 252/8.51; 252/8.551
[58] Field of Search ................ 252/8.51, 8.511, 8.514, 252/8.551

[56] References Cited

U.S. PATENT DOCUMENTS

| | | | |
|---|---|---|---|
| 2,109,858 | 3/1938 | Cannon | 252/8.511 |
| 2,191,312 | 2/1940 | Cannon | 252/8.511 |
| 2,575,276 | 11/1951 | Jacoby et al. | 252/321 |
| 2,589,949 | 3/1952 | Meadors | 252/8.51 |
| 2,637,692 | 5/1953 | Nahin . | |
| 3,236,769 | 2/1966 | Burdyn et al. | 252/8.51 |
| 3,633,689 | 1/1972 | Christman . | |
| 3,639,233 | 2/1972 | Schultz . | |
| 3,728,259 | 4/1973 | Christman . | |
| 4,033,893 | 7/1977 | Mondshine | 252/8.512 X |
| 4,464,269 | 8/1984 | Walker . | |

OTHER PUBLICATIONS

Gray et al, *Composition and Properties of Oil Well Drilling Fluids,* Fourth Ed., Pub. 1980, pp. 568 and 569.

*Primary Examiner*—Herbert B. Guynn
*Attorney, Agent, or Firm*—Pravel, Gambrell, Hewitt, Kimball & Krieger

[57] ABSTRACT

A drilling mud comprises water, a gelling agent, a defoamer and at least 6% by volume of a glycerine selected from the group consisting of glycerine, polyglycerine and mixtures thereof. The drilling mud is normally prepared by adding to a pre-existing water based mud having therein the gelling agent, caustic soda, lignite and lignosulfonate. A completion fluid comprises water, a defoamer and at least 6% by volume of a glycerine selected from the group consisting of glycerine, polyglycerine and mixtures thereof.

10 Claims, No Drawings

DRILLING AND COMPLETION FLUID

This invention relates to a drilling and completion fluid and a method of preparing the same.

Drilling mud or drilling fluid is a more-or-less complex mixture of chemicals used in drilling of a well to perform a variety of functions. Drilling mud comprises a liquid or slurry that is pumped down the drill string to exit through nozzles in the bit immediately adjacent the formation being penetrated. The drilling mud flows upwardly in the annulus between the drill string and the wall of the hole to the surface and provides a variety of functions. The drilling mud cools and lubricates the bit, delivers hydraulic horsepower to the bit, carries cuttings upwardly in the hole during circulation, suspends the cuttings in the bore hole when circulation stops, prevents blowouts, minimizes water loss into permeable formations, lubricates between the drill string and the bore hole wall and performs assorted other functions.

There are all sorts of drilling muds. The most elementary drilling mud is water mixed with drilled solids and is often called "native" drilling mud. Some of the drilled solids are clays which, when finely ground, provide several of the functions of drilling mud. Some of the drilled solids add weight to the slurry which raises the density of the mud to 9.2–9.9 #/gallon which is sufficient to control normal pressures at shallow depths in many actively drilled areas.

Native mud was the earliest used in the rotary drilling of oil and gas wells. It was soon discovered that native drilling mud provides almost no control over the loss of water into permeable formations, tends to wash out or enlarge the diameter of the hole, accumulate shale balls on the bit and have other major disadvantages. Since that time, a wide variety of chemicals have been added to drilling mud to overcome real or perceived problems with native drilling mud.

Almost all water based drilling muds start off with water to which gel or bentonite is added and to which drilled solids become entrained. The standard drilling mud in many areas of the world is now a native drilling mud to which has been added bentonite, sodium hydroxide, chrome lignosulfonate and lignite. In the event greater weight is needed, a particulate weighting material is added, such as barium sulfate, hematite, calcium carbonate, silica or the like. This type drilling mud is now being supplanted a native drilling mud - bentonite - sodium hydroxide mixture to which is added a liquid polymer chemical.

One desirable characteristic of a drilling mud is that it sets up or gels, like Jello, as it sits quietly. This characteristic is desirable so that cuttings or weight material in the drilling mud don't fall by gravity through the drilling mud toward the bottom of the hole when circulation stops. This characteristic is imparted to drilling mud by a gelling agent, such as drilled solids, bentonite and/or subbentonitic clays or mixtures thereof.

Another desirable characteristic of a drilling mud is that it creates a filter cake of low permeability on the face of permeable formations. Preferably, the filter cake should be relatively thin and hard as opposed to thick and gooey. As will be appreciated by those skilled in the art, the filter cake is created because the pressure in the bore hole exceeds the pressure in a permeable formation penetrated thereby and liquid from the mud is moved in to the permeable formation, leaving on the face of the formation of a filter cake comprising the solids entrained in the mud. The liquid lost to the formation is called filtrate. When a large amount of filtrate passes across the formation face, a thick filter cake is deposited. When a small amount of filtrate passes across the formation face, a thin filter cake is deposited. One function of the filter cake is to limit additional filtrate loss into the formation after the filter cake is created. A wide variety of chemicals have been used to produce thin filter cakes or reduce filtrate loss, such as carboxymethyl cellulose, lignite, lignosulfonates, Resin-X - available from Magobar, Miltemp - a high temperature polmyer available from Milpark, Claytemp - a polymer available from Barclay, Soltex - an asphalt based material available from Drilling Specialty and the like.

One purpose of a good filter cake is to reduce the quantity of filtrate lost to a permeable formation which is desirable for two reasons. First, a large amount of filtrate in the formation can affect the characteristics of many electric logs. Second, there is a danger of the filtrate causing materials in the permeable formation to swell, thereby reducing the permeability of a possibly productive formation to an extent where the formation will not produce or will not produce successfully. A fresh water filtrate, for example, causes many clays such as montmorillonite and ilite to swell.

Sodium hydroxide is added to many drilling muds to raise the pH thereof substantially because it was learned years ago that an alkaline drilling mud does not swell clays as contrasted to a neutral or acidic drilling mud. As will become more fully apparent hereinafter, most pre-existing muds to which the additives of this invention are used are quite alkaline because sodium hydroxide has usually been added thereto. After the glycerine based additives of this invention are added to a mud system, the use of sodium hydroxide is typically suspended because the glycerines used are sufficiently alkaline to keep the pH high.

A completion fluid is a liquid material used during the completion phase of a well, i.e. while perforating a productive formation or conducting operations on a well after it has been drilled and cased but excluding formation fracturing operations. A completion fluid differs from a drilling fluid mainly because it does not have to carry large quantities of cuttings upwardly in the annulus of the well bore, the only cuttings produced during completion operations being relatively small quantities of cement, case iron and rubber, as may occur when drilling up DV tools, bridge plugs, squeeze jobs or the like. Thus, completion fluids do not normally contain a gelling agent unless the fluid is very heavy and weighted with a solid weighting agent. There is not as much a requirement for lubrication in a completion fluid because there is considerably less friction between the inside of oilfield casing and a work string than between the bore hole wall and a drill string.

In many other respects, completion fluids must have properties similar to drilling muds, i.e. they must be non-damaging to potentially productive formations, they must be sufficiently heavy to offset the bottomhole pressure of permeable formations and the like.

The fluid of this invention is eminently suitable as a completion fluid because it does not swell clays which may be present in productive formations, it is capable of withstanding significantly high bottom hole temperatures without degradation, its flow characteristics are not degraded by the introduction of solid, liquid or gaseous contaminants, it can be weighted to any reasonable density for pressure control and it is rather inexpensive. In addition, a completion fluid made in accordance with this invention is quite suitable for use behind a packer to provide a noncorrosive relatively heavy liquid.

It is an object of this invention to provide an improved drilling mud which is stable at high temperatures, which has excellent lubricating qualities and which is particularly nondamaging to common clays found in permeable formations potentially productive of hydrocarbons.

Another object of this invention is to provide an improved completion fluid which is particularly nondamaging to common clays found in permeable formations potentially productive of hydrocarbons.

Other objects and advantages of this invention will become more fully apparent as this description proceeds.

In accordance with this invention, a water based drilling mud comprises water, a gelling agent, a defoamer and at least 6% by volume of a water soluble glycerine taken from the group consisting of glycerine, polyglycerine and mixtures thereof. To improve the character of the filter cake, a filter loss enhancer may be added. To increase the density of the drilling mud, a weight material may be added.

One of the peculiarities of the invention lies in how differently solids introduced into the mud are wet by the liquid phase of the drilling mud. Bentonite used in oil field mud is a fine powder and is added to ordinary drilling mud by simply pouring it out of a sack into a hopper emptying into a conduit through which mud is flowing. The bentonite particles hydrate and swell by adsorption of water contained in the drilling mud. Dry powdered bentonite added to a mud system of this invention is not water wet and accumulates in clay clumps floating on top of the mud. The bentonite is accordingly not wet by the water in the drilling mud. To overcome this difficulty, bentonite is prehydrated, i.e. it is mixed with water in a separate tank to form a slurry which is then introduced into the drilling mud of this invention.

This peculiarity illustrates a major difference between a drilling mud of this invention and drilling muds of the prior art, i.e. particulate materials introduced into the mud system of this invention tend to become suspended therein, are not affected by and do not affect water in the drilling mud and do not readily become an interacting part of the drilling mud. This same feature is experienced when drilling with a mud of this invention into a formation containing a material which contaminates or degrades a conventional drilling mud. For example, standard bentonite-sodium hydroxide-lignite-chrome lignosulfonate muds are contaminated by common minerals encountered during drilling, i.e. salt, gypsum, anhydrite or calcium carbonate, and change from a relatively free flowing slurry into a very stiff material which, in aggravated cases, can hardly be poured out of a beaker. Drilling the same materials with a mud of this invention has little or no perceivable affect on the drilling mud.

A simple experiment illustrates the peculiar result. About 500 ml of a mixture is prepared in a beaker, the mixture containing about 40% water and 60% of a glycerine-glycol solution. A small quantity of salt less than enough to supersaturate the solution is poured into the beaker and the beaker shaken well. Within a minute or two, salt particles can be seen settling out in the bottom of the beaker. Little or no salt enters the solution even though the liquid phase is 40% water. Thus, salt cannot contaminate the solutions and salt particles are merely suspended like a nonsoluble material.

Another peculiarity of the drilling mud of this invention is that the filtrate does not swell clays such as montmorillonite, ilite or the like when the proportion of glycerines is sufficiently high. The filtrate produced in a standard API filter press is a solution of water, glycerine and defoamer in the same proportions as in the drilling mud. A montmorillonite tablet dropped into a beaker of the filtrate where the glycerine concentration is above about 25–30% shows no perceptible swelling of the tablet in two days. In contrast, a montmorillonite tablet added to fresh water swells and disintegrates in a minute or two. At a glycerine concentration of 6%, swelling of a montmorillonite table is slowed significantly. At glycerine concentrations between 6–25%, swelling of montmorillonite tablets is progressively reduced.

Drilling of a typical well begins by using a so called "spud" mud. In most situations, spud mud is prepared by pumping highly treated mud from a previous well into a vacuum truck and watering it down with sufficient water to make it thin. Sometimes, spud mud is prepared by mixing bentonite in water so the resultant suspension contains 25–30# of bentonite per barrel of water.

After the surface hole is drilled and cased, the surface shoe and cement are drilled, followed by drilling out under surface. Either before drilling the hole or at some deeper depth where it is decided to mud up, the additives of this invention are admixed with the preexisting mud. It may be that there is sufficient gelling agent, i.e. drilled solids, bentonite, subbentonitic clays, and mixtures thereof, in the mud. In this event, a solution of glycerine and defoamer is simply added to the mud.

If there is insufficient gel in the pre-existing mud, three alternatives are available. First, more bentonite can be added to the pre-existing mud through a hopper before adding the glycerine and defoamer. Second, a slurry of bentonite and water may be prepared in a slug tank and slowly added to the mud tank or pit to increase the quantity of gel in the mud after adding glycerine and defoamer to the mud. Third, a slurry of bentonite and water may be prepared in a slug tank and slowly added to the mud tank or pit while contemporaneously adding a solution of glycerine and defoamer to the mud. As mentioned previously, dry powdered bentonite cannot be added to a mud system containing adequate quantities of glycerine and defoamer because the bentonite is not wet by the liquid phase.

The volume of a mud system is the sum of the volume of the hole and the volume of the mud tanks or pits. The volume of a mud tank or pit is usually assumed to be constant even though they partially fill up with drilled solids during the course of drilling a well. The volume of the hole increases substantially with drilling because the hole gets deeper. Thus, the volume of mud in a mud system has to increase during the course of drilling a well or the mud tank or pit will run dry. Accordingly, liquid is more-or-less continuously added to a mud system. In an ordinary water based drilling mud, liquid is added by allowing a stream of water from a water hose to flow into the mud return line or across the shale shaker. In maintaining a mud system of this invention, water is added conventionally but the liquid additives are prepared and placed in a tank of adequate size, e.g. a frac tank, and periodically pumped into the mud tank.

This is conveniently accomplished by providing a compressed air driven pump which is operated by a timer. The mud engineer clocks the time necessary to fill a five gallon bucket from the pump. If the analysis of the mud and the increase in hole volume will necessitate the daily addition of some volume of the glycerine-defoamer solution. The mud engineer determines this needed volume addition and leaves instructions for each driller to operate the compressed air driven pump for a predetermined number of minutes each tour, thereby adding the necessary volume of glycerine-defoamer solution every eight hours or so.

In a typical drilling well, a mud engineer conducts a variety of analyses on the drilling mud at frequent intervals, at least once a day. In the course of these tests, it is often determined that the sampled mud is deficient in one or more respects and appropriate corrective action is taken. In the mud system of this invention, there are usually only five things to do: (1) control the amount of gelling agent to be sure there is enough to carry drilled solids to the surface and provide sufficient gel strength to suspend solids if circulation is stopped; (2) control the filter loss of the mud by adding a filter loss reducer; (3) control the amount of glycerine-defoamer solution; (4) maintains the desired mud weight by adding weight material if necessary and (5) keeps the amount of solids suspended in the system under control by using mud cleaning equipment such as a mud centrifuge, cyclone or the like.

The desired amount of gelling agent in the mud varies substantially for a variety of reasons including the type gelling agent used. High yield Wyoming bentonite, which is a sodium montmorillonite, is the preferred gelling agent in modern drilling muds and is preferred with the mud of this invention. Typically, it is desired to use about 30# of bentonite in each barrel of spud mud and 10-20# of bentonite after drilling the surface pipe shoe. Other types of clays are quite suitable, such as medium yield drilling clays, calcium montmorillonite clays, and drilled solids. The amount of gelling agent to be used may range from about 5% by weight of the mud up to as high as about 75% by weight. The amount of bentonite in a drilling mud is determined either by a measurement of the gel strength of the mud or by a test known in the art as an MBT test. If there is too much bentonite, liquid is added to the mud system until the bentonite is diluted to the desired concentration. If there is too little bentonite, bentonite is added in a slurry form as previously mentioned.

If the drilling mud shows more filtrate loss than desired in a standard filter press test, a filter loss reducer may be added to the mud. The preferred filtrate loss reducer of this invention is powdered lignite, a conventional material for this purpose. Powdered lignite is added by mixing with water in a slug tank and then adding the slurry to the mud tank because the powdered lignite is not readily admixed with a drilling mud containing the glycerine-defoamer solution of this invention.

The glycerine or glycerol to be used may be simple glycerine, diglycerine, triglycerine, tetraglycerine, pentaglycerine, heavier polyglycerines and mixtures thereof. A preferred glycerine is a mixture of glycerine and polyglycerines available from Dow Chemical Company, Freeport, Texas and is known as Polyglycerine W-80. This material is a hydroxyl functional liquid which consists of various glycerols in an aqueous solution having the following typical properties:

TABLE I

| | |
|---|---|
| viscosity, cp at 25° | 550-1800 |
| % OH | 20-26 |
| % water | 22-23 |
| solubility in water | infinite |
| density, g/ml | 1.27 |
| lb/gal | 10.6 |
| pH | >13 |
| color | dark brown |

A typical analysis of Polyglycerine W-80 is shown in Table II.

TABLE II

| | wt % | OH functionality |
|---|---|---|
| glycerine | 10-13 | 3 |
| diglycerine | 16-23 | 4 |
| triglycerine | 5-7 | 5 |
| tetraglycerine | 4-6 | 6 |
| pentaglycerine | 3-4 | 7 |
| heavier polyglycerine | balance | 8+ |
| NaCl | 2-4 | |
| Na$_2$CO$_3$ | 3-1 | |
| water | 22-28 | |
| sodium salt of organic acid | 11-14 | |

It is believed that Polyglycerine W-80 available from Dow Chemical is a byproduct of some chemical manufacturing operation of which applicant is unaware. Thus, it would seem that the available material would vary from batch to batch, although no noticeable differences have been perceived in using this material in several wells. It is believed that Polyglycerine W-80 is an azeotropic mixture of water and glycerines because heating this mixture causes the mixture to boil off at a constant temperature and creates a reduction in the volume of material but does not apparently change the composition of the remaining material.

The glycerine in the drilling mud of this invention has a plurality of functions. It acts to lubricate the contacting surfaces between the drill pipe and the bore hole wall, to reduce filtrate in standard API mud filtrate tests with a filter press, to control the flow properties of the mud by lowering the yield point of the drilling mud and the plastic viscosity and to minimize sloughing shale problems. A major function of the glycerine is to get the water in the mud in solution and affect it in such a manner that drilled contaminates like salt, gypsum, anhydrite and calcium carbonate are held in suspension rather than in solution thereby preventing deterioration of the mud. The exact mechanism is not yet understood, but it is clear that the mud of this invention does not wet ordinarily drilled solids and thus does not swell clays of the type typically encountered in drilling a well.

When the amount of glycerine in solution in a drilling mud exceeds about 6%, the is a perceptible slowing of hydration or swelling of montmorillonite clays. Accordingly, a drilling mud of this invention includes at least 6% by volume glycerine. As the proportion of glycerine increases to about 25-30% by volume, the rate of hydration of montmorrillonite tablets decreases until substantially no swelling is perceptible. It is accordingly preferred that the proportion of glycerine exceeds 25%.

It might be thought that this constitutes a maximum desired level of glycerine in a mud of this invention. This is not true for a variety of reasons. First, having no safety margin against clay swelling, any salt water flow into the borehole necessarily reduces the amount of glycerine in the drilling mud, thereby reducing the glycerine concentration to below the damaging threshold. Second, higher glycerine concentrations are quite desirable when drilling sidetracked holes or other situations whereby lubricity is of considerable importance.

Another reason why high concentrations of glycerine are desirable relate to temperature stability. Water based muds are not particularly suited for extremely high temperature holes, e.g. above 325° because the mud gets hot and a great deal of water boils off the mud after it returns to the surface and the pressure thereof is reduced. By using a glycerine-water solution as the liquid phase of the drilling mud, the boiling point of the solution is raised substantially to a level significantly above that of water or glycerine alone. Thus, the maximum desirable proportion of glycerine is probably limited by temperature stability and is about 90% by volume.

Straight glycerine when used in a mud system has a disadvantage because it foams excessively. Thus, a defoamer of any suitable type is used in a amount effective to eliminate foaming or reduce it to unobjectionable levels. The preferred defoamer used in the drilling mud of this invention is a glycol selected from the group consisting of an alkylene glycol such as ethylene glycol, propylene glycol, and the like, a polyalkylene glycol such as polyethylene glycol, polypropylene glycol and the like and mixtures thereof. It appears that polypropylene glycol is the preferred glycol because it is less sensitive to high temperatures found in many moderate to deep wells. In most wells of moderate temperature, it appears that any glycol will act satisfactorily.

Many other defoamers are also usable in the fluid system of this invention such as LD-8 - an alcohol based defoamer available from Milpark, aluminum stearate and diesel, methyl ethyl ketone, methanol, Barclay's defoamer, CamServ defoamer, Unibar defoamer and Bosco defoamer.

One reason that glycol is a preferred defoamer is that it has a variety of other desirable attributes. It not only acts as a foam breaker or reducer to keep the glycerine from foaming excessively but also assists in controlling the flow properties of the fluid and recuces API filtrate loss.

Sufficient glycol is used to eliminate foaming or reduce it to an unobjectionable level. In addition, a greater quantity of glycol may be used to take advantage of some of its other advantageous properties if such are wanted. The amount of glycol is typically proportional to the amount of glycerine and varies between 2–50% by volume of the glycerine and is a minor component when compared to the amount of glycerine in the system.

EXAMPLE 1

A well in Plaquemines Parish, La. is drilled to 9200' using a conventional brackish water-caustic-bentonite-chrome lignosulfonate mud. At 9200', enough liquid glycerine-glycol solution is added to constitute 10% by volume glycerine-glycol solution. The amount of glycol in the additive is 10%. The glycerine component is Polyglycerine W-80 from Dow Chemical. The amount of glycerine in the drilling mud is about $0.10 \times 0.90 \times 0.75$ or about 6.6% by volume. The mud properties at 12,078' were:

| | |
|---|---|
| weight - 11.5 #/gal | funnel viscosity - 46 seconds |
| plastic viscosity - 15 cP | yield point - 9 cP |
| gel strength - 2/6 | API filtrate - 5.6 cc |
| cake thickness 2/32" | solids content - 23% |
| chlorides - 19,000 ppm | pH - 10.5 |

Drilling and logging progressed normally without difficulty.

EXAMPLE 2

A well in LaFource Parish, La. is drilled to 8000' using a conventional fresh water-caustic-bentonite-lignite-chrome lignosulfonate mud. At 8000', the well is sidetracked and 140 barrels of glycerine-glycol solution is added to the mud system, having a total volume of 1190 barrels. The amount of glycol in the additive is 10%. The glycerine component is Polyglycerine W-80 from Dow Chemical. The amount of glycerine in the drilling mud is about $145/1190 \times 0.9 \times 0.75$ or about 8.2% by volume. The mud properties at 8246' were:

| | |
|---|---|
| weight - 9.6 #/gal | funnel viscosity - 37 seconds |
| plastic viscosity - 11 cP | yield point - 7 cP |
| gel strength - 3/7 | API filtrate - 3.4 cc |
| cake thickness 2/32" | solids content - 5% |
| chlorides - 2800 ppm | pH - 10.0 |

Twenty to thirty barrels of glycerine-glycol solution is added daily to the mud system to maintain the glycerine concentration. In addition, bentonite and lignite are added daily. Periodically, barite is added for weight. At 10,330' hole angle is 43°. Except for rig breakdowns, drilling proceeds normally to total depth. During one rig breakdown, the drill string is in the open hole and not moved for two hours. After the breakdown is corrected, the driller raises the travelling block and, after pulling 15,000 pounds in excess of the weight of the drill string, the drill string comes loose. It was considered a minor miracle that the drill string wasn't struck and attributed to the lubricity of the drilling mud of this invention.

EXAMPLE 3

A native drilling mud is conditioned by adding thereto a prehydrated bentonite-lignite-slurry and a solution of glycerine and methanol sufficient to constitute 35% a glycerine-methanol by volume. The glycerine is simple glycerol. The methanol constitutes 10% by volume of the glycerine-methanol solution. A montmorillonite table is added to filtrate collected from an API filter press. No swelling of the tablet is noted.

EXAMPLE 4

A spud mud is prepared with fresh water by mixing 30#of bentonite per barrel of mud. To this mixture is added a quantity of glycerine mixture sufficient to amount to about 20% by volume of the mud system. The glycerine mixture consists of 50% simple glycerol and 50% diglycerine along with enough Barclay's defoamer to prevent foaming. A montmorillonite tablet is added to filtrate collected from an API filter press. No swelling of the tablet is noted.

EXAMPLE 5

A drilling mud is prepared by adding to a native mud-bentonite-caustic drilling mud enough liquid glycerine-glycol additive to constitute 55% by volume glycerine-glycol. The glycerine is a mixture of ⅓ glycerine, ⅓ diglycerine and ⅓ triglycerine. The glycol is 10% of the glycerine-glycol additive. A montmorillonite tablet is added to filtrate collected from an API filter press. No swelling of the tablet is noted.

EXAMPLE 6

A drilling mud is prepared by adding to a native mud-bentonite-caustic-lignite-chrome lignosulfonate slurry enough liquid glycerine-defoamer additive to constitute 35% by volume of the mud. The defoamer is Barclay's defoamer and constitutes 5% by volume of the additive. A montmorillonite tablet is added to filtrate collected from an API filter press. No perceptible swelling of the tablet is noted.

EXAMPLE 7

A drilling mud is prepared by adding to a native mud-bentonite-caustic-lignite-chrome lignosulfonate slurry enough simple glycerine to amount of 75% by volume of the mud. A methanol defoamer is added, amounting to 5% by volume of the mud. A montmorillonite tablet is added to filtrate collected from an API filter press. No swelling of the tablet is noted.

EXAMPLE 8

A 10 #/gal completion fluid is desired. Polyglycerine W-80, weighing 10.7 #/gal is diluted with enough polypropylene glycol to produce a 10#/gal mixture. No bentonite or barite is used.

EXAMPLE 9

A 15 #/gal completion fluid is desired. Polyglycerine W-80, weighing 10.7 #/gal, is diluted with enough water to produce a 10#/gal mixture. 5% by volume methanol is added to control foaming. A bentonite-water slurry is added to provide 10# of bentonite per barrel of completion fluid. Enough barite is added to raise the density to 15 #/gallon.

EXAMPLE 10

A 9.5 #/gal completion fluid is desired. A 50-50 mixture of simple glycerine and diglycerine is diluted with enough water to weight 9.5 #/gal. Barclay3 s defoamer in an amount of about 3% by volume. No barite or bentonite is used.

EXAMPLE 11

A 10 #/gal completion fluid is desired. Simple glycerine and polypropylene glycol are mixed in a ratio of 6:1. This solution is dilution with water to weight 10#/gal.

The term "petroleum wells" as used in the claims refers to both oil and gas wells.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A fluid for use in petroleum wells, comprising water, a defoamer and at least 6% by volume of a water soluble liquid selected from the group consisting of a polyglycerine, and mixtures of a polyglycerine with glycerine.

2. The fluid of claim 1 wherein the defoamer selected from the group consisting of alkylene glycol, polyalkylene glycol and mixtures thereof.

3. The fluid of claim 2 wherein the defoamer is in the range of 2–50% by volume of the water soluble liquid.

4. The fluid of claim 1 wherein the water soluble liquid is at least 25% by volume.

5. The fluid set forth in claim 1, wherein the fluid is used with drilling mud, and includes a gelling agent.

6. The fluid set forth in claim 5, wherein the defoamer is selected from the group consisting of ethylene glycol, propylene glycol, polyethylene glycol, polypropylene glycol, and mixtures thereof.

7. A drilling fluid comprising a mixture of solids and liquids, the solids comprising a gelling agent selected from the group consisting of drilled solids, bentonite, subbentonitic clays, and mixtures thereof, the liquids comprising a solution of water, a glycerine component selected from the group consisting of a polyglycerine and mixtures of a polyglycerine with glycerine and a glycol selected from the group consisting of alkylene glycol, polyalkylene glycol, and mixtures thereof, the glycerine component and glycol comprising 6–90% by volume of the liquid, the volume of the glycol being 2–50% of the volume of the glycerine component.

8. The fluid of claim 7 wherein solids further comprise powdered lignite.

9. A method for drilling a well through a heaving shale substratum, comprising the steps of:
drilling a well bore and circulating a fluid in the well bore, said fluid comprising water, a gelling agent, a defoamer and at least 6% by volume of a water soluble liquid selected from the group consisting of polyglycerine, and mixtures thereof with glycerine.

10. The method of claim 9, wherein said fluid includes a mixture of glycerine and polyglycerine.

* * * * *